(12) United States Patent
Tasaki et al.

(10) Patent No.: US 6,633,044 B2
(45) Date of Patent: *Oct. 14, 2003

(54) STIMULABLE PHOSPHOR SHEET AND PROCESS FOR PRODUCING THE SAME

(75) Inventors: Seiji Tasaki, Kanagawa (JP); Katsuhiro Kohda, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 114 days.

This patent is subject to a terminal disclaimer.

(21) Appl. No.: 09/836,539

(22) Filed: Apr. 18, 2001

(65) Prior Publication Data

US 2002/0022199 A1 Feb. 21, 2002

(30) Foreign Application Priority Data

Apr. 18, 2000 (JP) ........................................ 2000-116077

(51) Int. Cl.$^7$ ................................................. G21K 4/00
(52) U.S. Cl. ..................................................... 250/484.4
(58) Field of Search ...................................... 250/484.4

(56) References Cited

U.S. PATENT DOCUMENTS

| | | | | |
|---|---|---|---|---|
| 5,886,354 A | * | 3/1999 | Leblans | 250/484.4 |
| 6,180,949 B1 | * | 1/2001 | Leblans | 250/484.4 |
| 6,359,285 B1 | * | 3/2002 | Tasaki et al. | 250/484.4 |
| 6,376,844 B1 | * | 4/2002 | Tasaki et al. | 250/484.4 |

* cited by examiner

*Primary Examiner*—Constantine Hannaher
(74) *Attorney, Agent, or Firm*—Sughrue Mion, PLLC

(57) ABSTRACT

A stimulable phosphor sheet for radiation image recording and reproducing method is composed of at least two partitioned stimulable phosphor films laminated one or another [the partitioned stimulable phosphor film is composed of plural partitions that divide the stimulable phosphor film on a plane thereof to give plural stripe sections, and a stimulable phosphor layer placed in each stripe section] in such manner that the partitions of one stimulable phosphor film are arranged to cross the partitions of another stimulable phosphor film.

13 Claims, 5 Drawing Sheets

Heating under Pressure

STIMULABLE PHOSPHOR SHEET AND PROCESS FOR PRODUCING THE SAME

FIELD OF THE INVENTION

The present invention relates to a stimulable phosphor sheet employable in a radiation image recording and reproducing method utilizing stimulated emission from a stimulable phosphor.

BACKGROUND OF THE INVENTION

As a method replacing a conventional radiography using a combination of a radiographic film and radiographic intensifying screens, a radiation image recording and reproducing method utilizing a stimulable phosphor was proposed and has been practically employed. The method employs a radiation image storage panel comprising a stimulable phosphor layer (i.e., stimulable phosphor sheet) provided on a support, and the procedure of the method comprises the steps of causing the stimulable phosphor in the phosphor sheet to absorb radiation energy having passed through an object or having radiated from an object; sequentially exciting the stimulable phosphor with stimulating rays to release the radiation energy stored in the phosphor as light emission (i.e., stimulated emission); photoelectrically detecting the emitted light to obtain electric signals; and reproducing the radiation image of the object as a visible image from the electric signals. The stimulable phosphore sheet thus processed is subjected to a step for erasing a radiation image remaining therein, and then stored for the next recording and reproducing procedure. Thus, the radiation image storage panel can be repeatedly employed.

Generally, a substrate film and a protective cover film are provided on the top and bottom surfaces of the stimulable phosphor sheet, respectively. The stimulable phosphor sheet generally comprises a binder and stimulable phosphor particles dispersed therein, but it may consist of agglomerated phosphor without binder. The phosphor sheet containing no binder can be formed by deposition process or sintering process. Further, the sheet comprising agglomerated phosphor soaked with a polymer is also known. In the aforementioned method, any types of the stimulable phosphor sheets are employable.

The radiation image recorded in the stimulable phosphor sheet is generally read by the steps of applying stimulating rays onto the front surface side (phosphor layer side) of the phosphor sheet, collecting light emitted by the phosphor particles by means of a light-collecting means from the same side, and photoelectrically converting the light into image signals. A system for reading the image from one side of the panel in this manner is referred to as "single-side reading system". However, there is a case that the light emitted by the phosphor particles should be collected from both sides (i.e., front and the back surface sides) of the phosphor sheet. For instance, there is a case that the emitted light is desired to be collected as much as possible. There also is a case that the radiation image recorded in the phosphor layer varies along the depth of the layer, and that it is desired to detect the variation. A system for reading the image from both sides of the phosphor sheet is referred to as "double-side reading system".

The radiation image recording and reproducing method is often used in radiography for medical diagnosis. In that case, it is especially desired to reproduce a radiation image of high quality (particularly, high sharpness for high resolution) by applying a small dose of radiation. Therefore, the stimulable phosphor sheet is required to have a high sensitivity and to provide an image of high quality.

The sharpness of radiation image is mainly affected by diffusion or scattering of the stimulating rays in the phosphor sheet or layer. The procedure for reading the latent image comprises the steps of sequentially scanning a beam of the stimulating rays on the surface of the phosphor sheet to induce the stimulated emission, and successively collecting and detecting the emission. If the stimulating rays diffuse or scatter (horizontally in particular) in the sheet, it excites the phosphor not only at the target spot but also in its periphery. Consequently, the stimulated emission emitted from the target position is collected together with that from the periphery. Such contamination of the emissions impairs the sharpness of the resultant image.

For avoiding the diffusion or scattering of the stimulating rays, it has been proposed to divide the plane of the stimulable phosphor sheet into small sections with partitions reflecting the stimulating ray.

Japanese Patent Provisional Publication No. 59-202100 discloses a stimulable phosphor sheet of a honeycomb structure consisting of many small cells filled with a stimulable phosphor. The phosphor sheet is composed of a substrate and a stimulable phosphor layer, and the honey-comb structure sectioned with a partition is further provided on the phosphor layer.

Japanese Patent Provisional Publication No. 62-36599 discloses a stimulable phosphor sheet employing a support provided with many hollows regularly arranged on one surface. The hollows are filled with stimulable phosphor, and the ratio of depth to diameter of each hollow is 3.5 or more.

Japanese Patent Provisional Publication No. 5-512636 discloses a process for preparing pixel phosphors with a mold.

Japanese Patent Provisional Publication No. 2-129600 discloses a storage panel employing a support plate having many holes vertically bored and filled with a stimulable phosphor.

Further, Japanese Patent Provisional Publication No. 2-280100 discloses a stimulable phosphor sheet employing a substrate having a honey-comb micro-structure filled with a stimulable phosphor.

In each aforementioned known phosphor sheet employing a support or substrate provided with many holes or hollows incorporated with a phosphor, a part of the support or substrate serves as a partition preventing the simulating rays from diffusion. The stimulable phosphor sheet of this type, therefore, is useful for improving quality (particularly, sharpness) of the resulting radiation image. On the other hand, since the partition of support material partly occupies the phosphor layer, the amount of the phosphor incorporated in a unit volume of the layer is often too small to absorb enough amount of radiation. Consequently, the partition lowers the sensitivity of the stimulable phosphor sheet. Although the sensitivity can be enhanced by thickening the phosphor layer, a thick phosphor layer generally impairs the sharpness.

In radiography for medical diagnosis, the use of a stimulable phosphor sheet of high sensitivity can reduce a dose of radiation to be applied to a patient. Therefore, it is needed to provide a stimulable phosphor sheet giving an image of higher sharpness with higher sensitivity.

SUMMARY OF THE INVENTION

The present invention resides in a stimulable phosphor sheet for radiation image recording and reproducing method comprising the steps of recording a radiation image as a latent image, irradiating the latent image with stimulating rays to release stimulated emission, collecting the stimulated emission, and electrically processing the collected emission to reproduce the radiation image, comprising at least two partitioned stimulable phosphor films laminated one on another, the partitioned stimulable phosphor film comprising plural partitions that divide the stimulable phosphor film on a plane thereof to give plural stripe sections, and a stimulable phosphor layer placed in each stripe section, in such manner that the partitions of one stimulable phosphor film are arranged to cross the partitions of another stimulable phosphor film.

In the stimulable phosphor sheet of the invention, the partitions of one stimulable phosphor film are preferably arranged to perpendicularly cross the partitions of another stimulable phosphor film, or to cross the partitions of another stimulable phosphor film at an angle of 45° or 60°.

In the invention, the stimulable phosphor sheet preferably comprises 2 to 100 stimulable phosphor films, more preferably comprises 2 to 10 stimulable phosphor films, and preferably has a thickness in the range of 50 $\mu$m to 1,500 $\mu$m. The stimulable phosphor film preferably has a thickness in the range of 10 $\mu$m to 1,000 $\mu$m, more preferably 50 $\mu$m to 200 $\mu$m. The stimulable phosphor film laminated on another stimulable phosphor film preferably has a thickness smaller than that of the latter phosphor film, so as to improve an image quality of the radiation image reproduced in the radiation image reproducing procedure.

The stimulable phosphor films of the invention preferably has the partition comprising low light-absorbing fine particles and a binder. In particular, the low light-absorbing fine particles comprises metal oxide.

The stimulable phosphor layer of the invention preferably comprises stimulable phosphor particles and a polymer binder.

In the stimulable phosphor sheet of the invention, the laminate of the stimulable phosphor films are placed between a transparent cover film and a transparent substrate film or between a transparent cover film and a light-reflective substrate film.

The above-mentioned stimulable phosphor sheet of the invention is preferably produced by a process which comprises the steps of:

producing plural stimulable phosphor films and plural partition films;

laminating the stimulable phosphor films and the partition films alternately, to produce a laminate block;

slicing the laminate block perpendicularly to the plane of the phosphor film, so as to give plural partitioned stimulable phosphor films;

laminating the plural partitioned stimulable phosphor films in such manner that the partitions of one stimulable phosphor film are arranged to cross the partitions of another stimulable phosphor film; and heating the laminate under pressure.

DETAILED DESCRIPTION OF THE INVENTION

A stimulable phosphor sheet of the invention comprises at least two partitioned stimulable phosphor films laminated one on another. The partitioned stimulable phosphor film comprises plural partitions that divide the stimulable phosphor film on its plane to give plural stripe sections, and a stimulable phosphor layer placed in each stripe section. The partitioned stimulable phosphor films are laminated in such manner that the partitions of one stimulable phosphor film are arranged to cross the partitions of another stimulable phosphor film.

Figure 1:
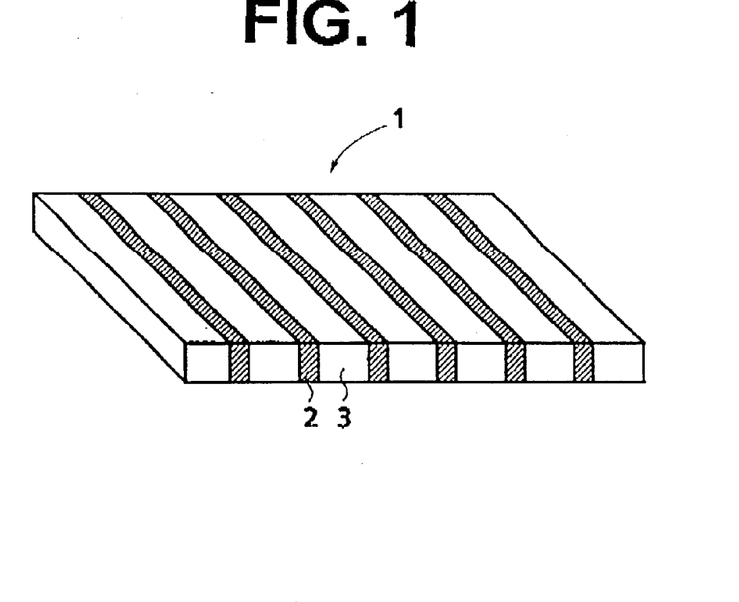
FIG. 1 shows a partitioned stimulable phosphor film for the use for the preparation of a stimulable phosphor sheet of the invention.

The partitioned stimulable phosphor film is described in detail by referring to FIG. 1 of the attached drawings. In FIG. 1, the partitioned stimulable phosphor film 1 is composed of partitions 2 and stimulable phosphor layers placed in the areas between the partitions. For accomplishing appropriate resolution and image quality, the mean width of the partition preferably is in the range of 0.5 to 50 $\mu$m. The stripe of the phosphor layer preferably has a mean width in the range of 5 to 300 $\mu$m. A ratio of a total surface of the stimulable phosphor layer 3 to a total surface of the phosphor film 1, that is a ratio of effective phosphor layer, preferably is in the range of 40% to 98%.

In the stimulable phosphor sheet of the invention, the partition of the stimulable phosphor film preferably has a light-scattering length for the stimulating rays which is shorter than that of the stimulable phosphor layer. In particular, the partition preferably has a light-scattering length of 0.05 to 20 $\mu$m for the stimulating rays and a light-absorption length of 1,000 $\mu$m or longer for the stimulating rays, while the stimulable phosphor layer has a light-scattering length of 20 to 1,000 $\mu$m for the stimulating rays and a light-absorption length of 1,000 $\mu$m or longer for the stimulating rays.

The term of light-scattering length indicates a mean distance in which a light travels straight until it is scattered, and therefore a shorter light-scattering length means that the phosphor layer or partition highly scatters a light. The term of light-absorption length indicates a mean free distance in which the stimulated emission is absorbed, and therefore a longer light-absorption length means that the phosphor layer or partition shows a lower light absorbance.

The light-scattering length and light-absorption length can be determined by calculation according to Kubeluka-Munk theory.

In FIG. 1, the top and bottom of the partition 2 are exposed over each surface of the stimulable phosphor film 1. However, the top and/or bottom of the partition 2 may be buried in the stimulable phosphor sheet. The partition preferably has a height corresponding to 1/3 to 1/1 of the thickness of the stimulable phosphor film 1.

Figure 2:
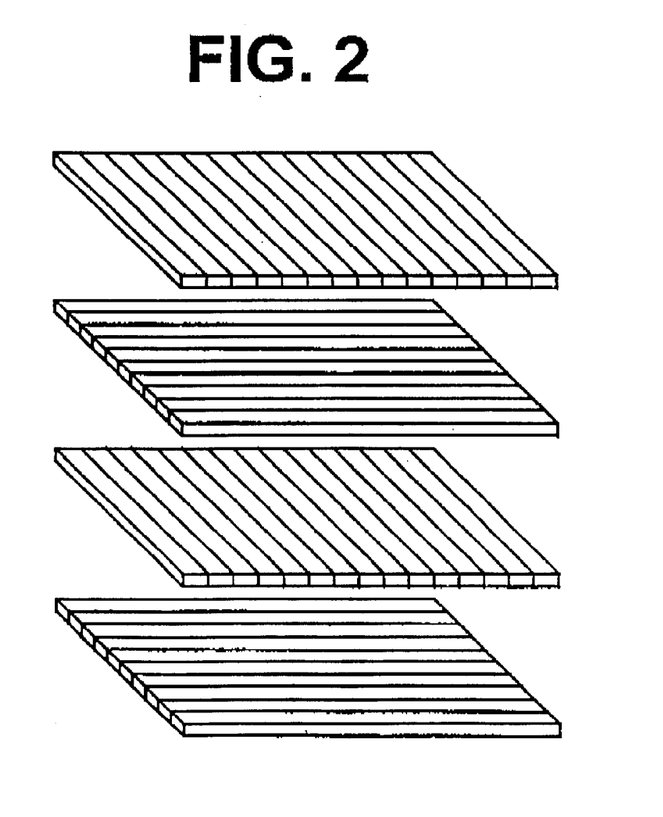
FIG. 2 shows a set of plural partitioned stimulable phosphor films which are to be laminated in the illustrated mode to give a stimulable phosphor sheet in which the partitions of one stimulable phosphor film are arranged to perpendicularly cross the partitions of another stimulable phosphor film.

In FIG. 2, a set of four partitioned stimulable phosphor films 1 which are to be laminated in the illustrated mode to give a stimulable phosphor sheet in which the partitions of one stimulable phosphor film are arranged to perpendicularly (namely at an angle of approximately 90°) cross the partitions of another stimulable phosphor film. Each partitioned stimulable phosphor film preferably is identical to each other.

Figure 3:
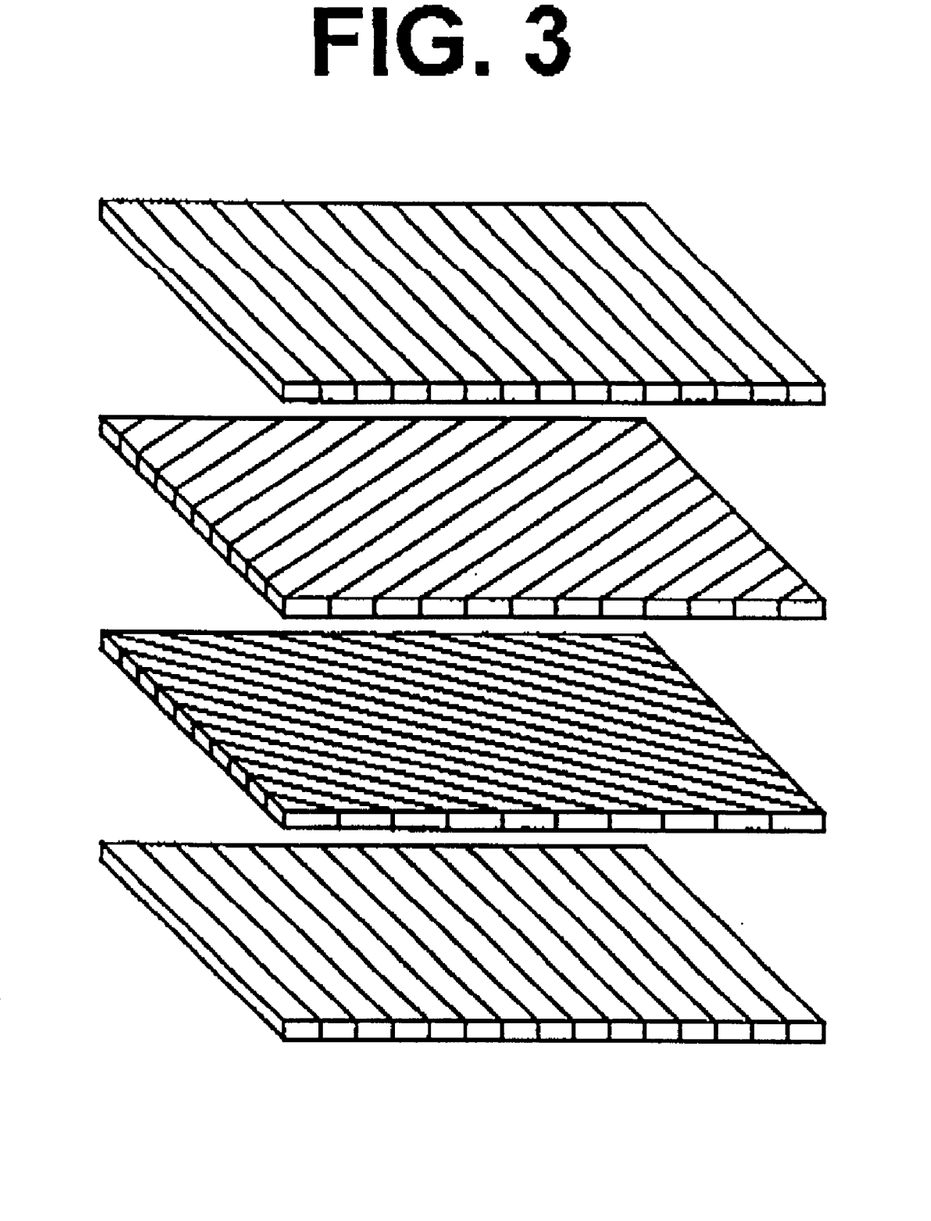
FIG. 3 shows a set of plural partitioned stimulable phosphor films which are to be laminated in the illustrated mode to give a stimulable phosphor sheet in which the partitions of one stimulable phosphor film are arranged to cross the partitions of another stimulable phosphor film at an angle of 45° and 90°.

In FIG. 3, a set of four partitioned stimulable phosphor films which are to be laminated in the illustrated mode to give a stimulable phosphor sheet. In the illustrated mode, the partitions of the top stimulable phosphor film are arranged to cross the partitions of the second stimulable phosphor film at an angle of 45°; the partitions of the second stimulable phosphor film are arranged to cross the partitions of the third stimulable phosphor film at an angle of 90°; and the partitions of the third stimulable phosphor film are arranged to cross the partitions of the fourth (i.e., bottom) stimulable phosphor film at an angle of 45°. Each partitioned stimulable phosphor film preferably is identical to each other.

The stimulable phosphor sheet of the invention comprises plural partitioned thin stimulable phosphor films which are so arranged as to form square, rhombic, or triangle plural cells which are observed in the direction perpendicular to the plane of the phosphor sheet. Thus, the specific arrangements of partitions of the adjoining partitioned stimulable phosphor films results in producing imaginary cell structures in the phosphor sheet, to define scattering of the stimulating rays in the cells.

In the radiation image reproducing procedure, the stimulable phosphor sheet of the invention is preferably moved in the direction parallel to the partitions of the top partitioned phosphor film, while the stimulating rays are scanned in a direction perpendicular to the direction of movement.

The stimulable phosphor sheet of the invention can be preferably produced in the process illustrated in FIG. 4 through FIG. 7. The preferred process is further described below, by referring to the case that the stimulable phosphor layer comprises stimulable phosphor particles and binder, and the partition comprises low light-absorbing fine particles and polymer material.

In the first step, a stimulable phosphor film is prepared.

As the stimulable phosphor, a phosphor giving a stimulated emission of a wavelength in the region of 300 to 500 nm when it is irradiated with stimulating rays of a wavelength in the region of 400 to 900 nm is preferably employed. In Japanese Patent Provisional Publications No. 2-193100 and No. 4-310900, some examples of the stimulable phosphors are described in detail. Examples of the preferred stimulable phosphors include divalent europium or cerium activated alkaline earth metal halide phosphors (e.g., BaFBr:Eu, BaF(BrI):Eu), and cerium activated oxyhalide phosphors.

Most preferred stimulable phosphors are rare earth metal activated alkaline earth metal fluorohalide phosphors having the following essential formula (I):

$$M^{II}FX:zLn \qquad (I)$$

in which $M^{II}$ is an alkaline earth metal such as Ba, Sr, or Ca; Ln is a rare earth metal such as Ce, Pr, Sm, Eu, Tb, Dy, Ho, Nd, Er, Tm, or Yb; X is a halogen atom such as Cl, Br, or I; and z is a value satisfying the condition of $0<z\leq 0.2$.

$M^{II}$ of the formula (I) preferably comprises Ba in an amount of 50 atomic % or more. Ln preferably is Eu or Ce. It should be noted that the formula (I) does not mean F:X=1:1, but means to have a crystalline structure of BaFX. Thus, the formula (I) does not accurately indicate stoichiometric amounts of the constitutional elements. It is generally preferred that F is slightly rich in comparison with X, because $F^+$ center ($X^-$ center) produced in such composition efficiently gives a stimulated emission when the phosphor is stimulated with a light in the region of 600 to 700 nm.

The stimulable phosphor of the formula (I) can further contain one or more of the following additive components:

bA, $wN^I$, $xN^{II}$, $yN^{III}$

In the above formulas, A is a metal oxide such as $Al_2O_3$, $SiO_2$ or $ZrO_2$, in which source of the metal oxide preferably is extremely fine particles having a mean diameter (of primary particles) of 0.1 μm or less and has little reactivity to $M^{II}FX$ particles to keep the $M^{II}FX$ particles from coagulation; $N^I$ is a compound of an alkali metal such as Li, Na, K, Rb, or Cs; $N^{II}$ is a compound of an alkaline earth metal such as Mg and/or Be; and $N^{III}$ is a compound of a monovalent or trivalent metal such as Al, Ga, In, Tl, Sc, Y, La, Gd, or Lu. The metal compounds preferably are halide compounds such as those described in Japanese Patent Provisional Publication No.59-75200.

In the formulas, each of b, w, x, and y is a value which means an amount of each source material, based on one molar amount of $M^{II}FX$, under the conditions of $0\leq b\leq 0.5$, $0\leq w\leq 2$, $0\leq x\leq 0.3$, and $0\leq b\leq 3$. Accordingly, the value of b, w, x, or y does not necessarily mean the amount of each element or compound existing in the finally produced phosphor. Further, each additive compound may exist as such in the finally produced phosphor or may react with $M^{II}FX$ in the course of the preparation of the stimulable phosphor.

Furthermore, the stimulable phosphor of the formula (I) may contain one or more of the following compounds or reaction products thereof:

Compounds of Zn and Cd described in Japanese Patent Provisional Publication No. 55-12145;

Metal oxides such as $TiO_2$, BeO, MgO, CaO, SrO, BaO, ZnO, $Y_2O_3$, $LA_2O_3$, $In_2O_3$, $GeO_2$, $SnO_2$, $Nb_2O_5$, $Ta_2O_5$, and $ThO_2$ described in Japanese Patent Provisional Publication No. 55-160078;

Compounds of Zr and Sc described in Japanese Patent Provisional Publication No. 56-116777;

Compounds of B described in Japanese Patent Provisional Publication No. 57-23673;

Compounds of As and Si described in Japanese Patent Provisional Publication No. 57-23675;

Tetrafluoroborate compounds described in Japanese Patent Provisional Publication No. 59-27980;

Hexafluoro compounds such as monovalent or divalent salts of hexafluorosilicic acid, hexafluorotitanic acid, or hexafluorozirconic acid described in Japanese Patent Provisional Publication No. 59-47289; and Compounds of transitional metals such as V, Cr, Mn, Fe, Co, and Ni described in Japanese Patent Provisional Publication No. 59-56480.

Moreover, other additives may be incorporated, provided that the incorporated additives do not disturb the preparation of the essential phosphor composition of the formula (I).

The rare earth activated alkaline earth metal fluorohalide phosphors of the formula (I) generally have an aspect ratio of 1.0 to 5.0. The stimulable phosphor particles favorably employed for the production of the stimulable phosphor sheet of the invention have an aspect ratio of 1.0 to 2.0, more preferably 1.0 to 1.5. The particle size preferably is in the range of 1 μm to 10 μm, more preferably 2 μm to 7 μm, in terms of Median diameter (Dm), and σ/Dm (σ is a standard deviation of the particle size distribution) preferably is not more than 50%, more preferably not more than 40%. The particles may be in the form of parallelepiped, regular hexahedron, regular octahedron, tetradecahedron, intermediate polyhedron, or amorphous. The phosphor particles of tetradecahedron are preferred.

Examples of the binders include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth) acrylate, vinyl chloride-vinyl acetate copolymer, polyurethane, cellulose acetate butyrate, polyvinyl alcohol, linear polyester, and thermoplastic elastomers. The polymer material may be crosslinked.

The stimulable phosphor particles and binder are placed in an appropriate solvent to prepare a dispersion. The ratio of binder and stimulable phosphor particles in the phosphor dispersion generally is in the range of 1:1 to 1:100 (binder:phosphor, by weight), preferably 1:8 to 1:40.

Figure 4:
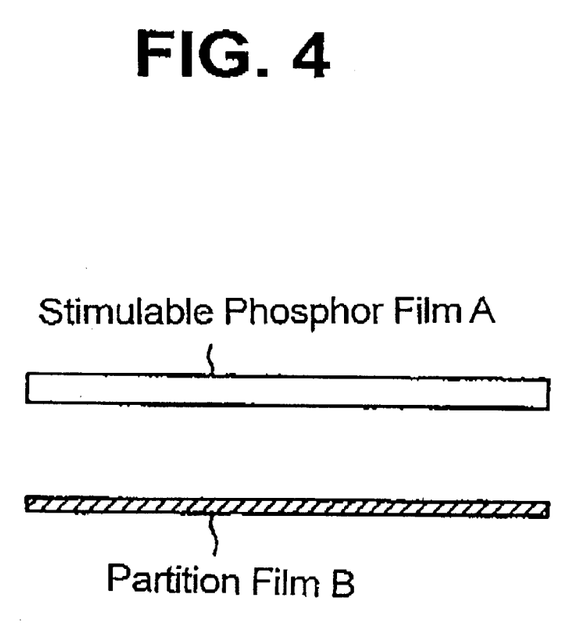
FIG. 4 shows a set of stimulable phosphor film A and partition film B.

The phosphor dispersion is coated on a temporary support such as glass plate, metal plate, or plastic sheet, and dried to give a stimulable phosphor film A illustrated in FIG. 4. The produced stimulable phosphor film may be compressed under heating, so as to increase the density of the phosphor film.

Alternatively, the stimulable phosphor film can be prepared by depositing or sintering stimulable phosphor material on a heat-resistant support such as metal plate.

The partition film B is described below.

Examples of the low light-absorbing fine particles are fine particles of white inorganic materials such as aluminum oxide (i.e., alumina), titanium dioxide, yttrium oxide, zirconium oxide, gadolinium oxide, tellurium oxide, ruthenium oxide, and lead oxide. Certain stimulable phosphor particles may be employed as the low light-absorbing fine particles. Preferred are alumina particles and yttrium oxide. The low light-absorbing fine particles preferably have a mean particle diameter of 0.01 to 5.0 μm.

There are no specific limitation with respect to the polymer binder for production of the partition film B, and the binders described hereinbefore for the production of the stimulable phosphor film A can be employed. In order to shorten the light-scattering length of the partition, however, a ratio of Kf (i.e., refractive index of the low light-absorbing fine particles) to the refractive index of the polymer binder preferably is in the range of 1.1 to 3.0. Therefore, the polymer binder preferably is polyurethane, polyacrylate, polyethylene, polystyrene, or a fluororesin.

For the production of the partition film, a dispersion is prepared by mixing the low light-absorbing fine particles and the polymer binder in a solvent. The polymer binder and the low light-absorbing fine particles are mixed generally at a ratio of 1:80 to 1:3 (by weight), preferably 1:20 to 1:10 (by weight).

The dispersion is coated on a temporary support, and dried to give a partition film B illustrated in FIG. 4.

Figure 5:
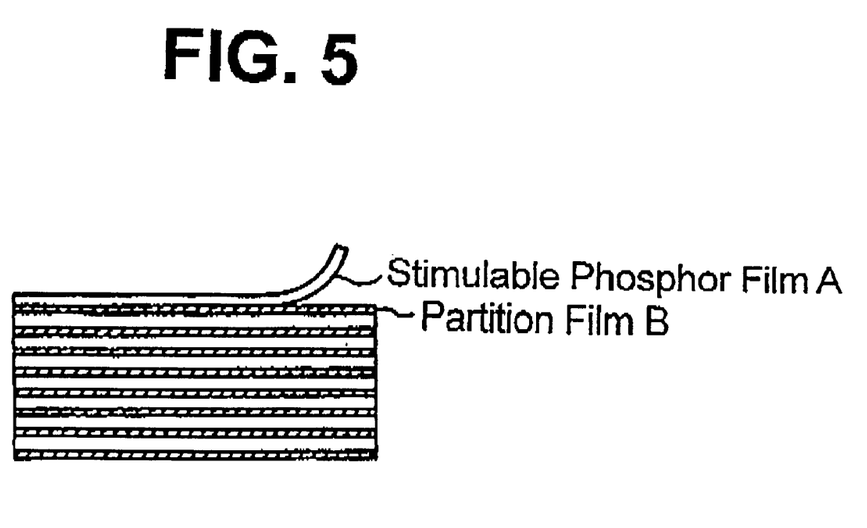
FIG. 5 shows a laminate composed of stimulable phosphor films A and partition films B which are placed alternately.
Figure 6:
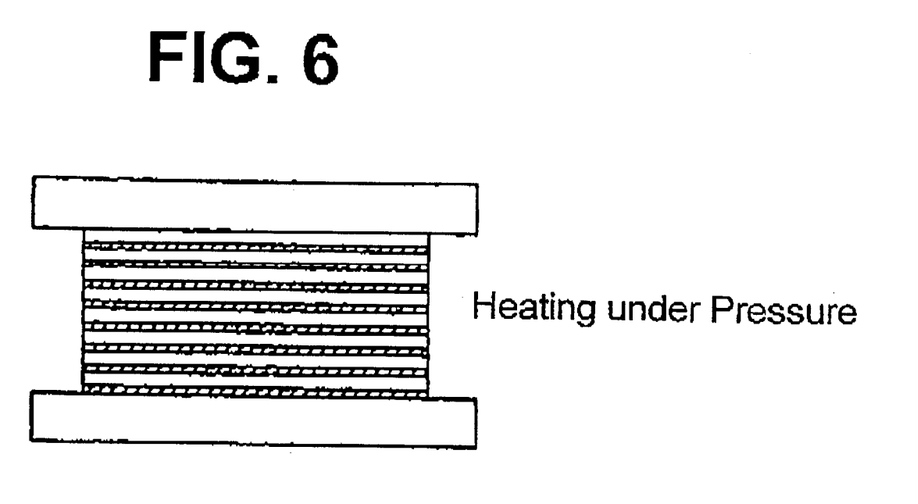
FIG. 6 shows a step for heating the laminate produced in FIG. 5 under pressure.

The preparation of the stimulable phosphor film A is repeated to produced a plurality of stimulable phosphor films, and the preparation of the partition film B is repeated to produced a plurality of partitions films. The stimulable phosphor films and partition films are then placed alternately to give a laminate illustrated in FIG. 5. The laminate of FIG. 5 is then heated under pressure in the manner illustrated in FIG. 6, to give a laminate block in which the stimulable phosphor films and partition films are bonded to each other.

The laminate block is then sliced along the surface perpendicular to the planes of the phosphor films and partition films, so that a partitioned stimulable phosphor film such as that illustrated in FIG. 1 is produced. The slicing procedure is repeated to give a plurality of partitioned stimulable phosphor films.

The partitioned stimulable phosphor films are then laminated in the manner illustrated in FIG. 2 or FIG. 3, and heated under pressure in the manner such as that illustrated in 6, to produce a stimulable phosphor sheet of the invention.

Figure 8:
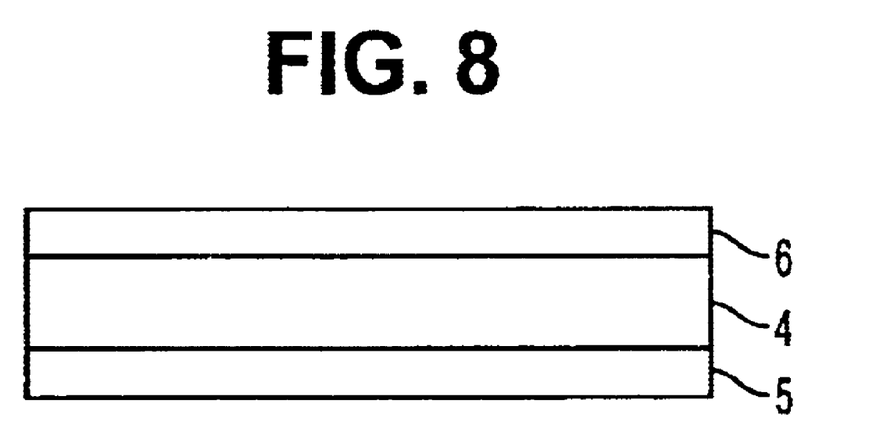
FIG. 8 shows an example of a stimulable phosphor sheet of the invention which has a substrate and a transparent cover film.

The stimulable phosphor sheet of the invention may have a support and a transparent cover film as illustrated in FIG. 8 in which the stimulable phosphor sheet 4 has a support 5 and a transparent cover film 6, so as to keep the phosphor sheet from deterioration and to facilitate handling of the phosphor sheet. The stimulable phosphor sheet also can have a light-reflective layer on one surface side (or between the phosphor sheet and the support, if the support is provided), so as to increase the sensitivity of the phosphor sheet.

As the support, a sheet or a film of flexible resin material having a thickness of 50 μm to 1 mm is generally employed. The support may be transparent or may contain light-reflecting material (e.g., alumina particles, titanium dioxide particles, and barium sulfate particles) or voids, for reflecting the stimulating rays or the stimulated emission. Further, it may contain light-absorbing material (e.g., carbon black) for absorbing the stimulating rays or the stimulated emission. Examples of the resin materials include polyethylene terephthalate, polyethylene naphthalate, aramid resin and polyimide resin. The support may be a sheet of other material such as metal, ceramics and glass, if needed. On the phosphor sheet-side surface of the support, auxiliary layers (e.g., light-reflecting layer, light-absorbing layer, adhesive layer, electroconductive layer) or many hollows may be provided. On the other side surface, a friction-reducing layer or an anti-scratch layer may be formed.

On the surface not facing the support, the stimulable phosphor sheet may have a protective cover film. In order not to affect the simulating rays or the stimulated emission, the cover film preferably is transparent. Further, for efficiently protecting the stimulable phosphor sheet from chemical deterioration and physical damage, the protective film should be both chemically stable and physically strong.

The cover film can be provided by fixing a before-hand prepared transparent plastic film (e.g., polyethylene terephthalate) on the stimulable phosphor sheet with adhesive, or by coating the phosphor sheet with a solution of cover film material and drying the coated solution. Into the cover film, fillers of fine particles may be incorporated so as to reduce blotches caused by interference and to improve the quality of the resultant radiation image. The thickness of the cover film generally is in the range of approx. 0.1 to 20 μm.

For enhancing the resistance to staining, a fluororesin layer is preferably provided on the cover film. The fluororesin layer can be formed by coating the surface of the cover film with a solution of a fluororesin in an organic solvents, and drying the coated solution. The fluororesin may be used singly, but generally a mixture of the fluororesin and a film-forming resin is employed. In the mixture, an oligomer having polysiloxane structure or perfluoroalkyl group can be further added. Into the fluororesin layer, a filler of fine particles may be incorporated so as to reduce blotches caused by interference and to improve quality of the resultant radiation image. The thickness of fluororesin layer generally is in the range of 0.5 to 20 μm. In the formation of the fluororesin layer, additives such as a crosslinking agent, a film-hardening agent and an anti-yellowing agent can be used. In particular, the crosslinking agent advantageously improves durability of the fluororesin layer.

The light-reflective layer can comprise a white pigment such as alumina pigment, titanium dioxide pigment, or a barium sulfate pigment, or phosphor particles giving no stimulated emission. In the light-reflective layer, the pigment or particles are dispersed and supported in a binder.

The present invention is further described by the following examples.

EXAMPLE 1

1) Stimulable phosphor (BaF(Br,I):Eu) particles (median of the particle sizes; 5 μm) and a thermoplastic high molecular weight-polyester resin were dispersed in an organic solvent in a weight ratio of 5:1. The prepared phosphor dispersion was coated on a temporary support having a releasing surface, and dried to give a dry phosphor film. The phosphor film thus formed was then peeled from the temporary support to give a stimulable phosphor film A (thickness: approx. 100 μm).

The stimulable phosphor film A was subjected to measurement of transmittance at a stimulating wavelength (600 nm) and a stimulated emission wavelength (400 nm), to determine the light-scattering length and light-absorbing length. It was confirmed that the light-scattering length at the stimulating wavelength was such long as to give 66 μm and the light-absorbing length was such long as a length of longer than 1,000 μm.

2) Particles of yttrium oxide (mean particle size: 0.6 μm) and a thermoplastic high molecular weight-polyester resin were dispersed in an organic solvent in a weight ratio of 15:1. Thus prepared yttrium oxide particle-containing dispersion was coated onto a temporary support having a releasing surface, and dried to give a yttrium oxide particle-containing dry film. The dry film was then peeled from the temporary support to give a partition film B (thickness: approx. 30 μm).

The partition film B was subjected to measurement of transmittance at a stimulating wavelength (600 nm) and a stimulated emission wavelength (400 nm), to determine the light-scattering length and light-absorbing length. It was confirmed that the light-scattering length at the stimulating wavelength was such short as to give 4 μm and the light-absorbing length was such long as a length of longer than 1,000 μm.

3) The stimulable phosphor films A and the partition films B were alternately piled up to form a laminate consisting of 360 films. The la te was then heated under pressure (pressure: approx. 1 kg/cm$^2$, temperature: 100° C.) for 1 hour to produce a laminate block.

Figure 7:
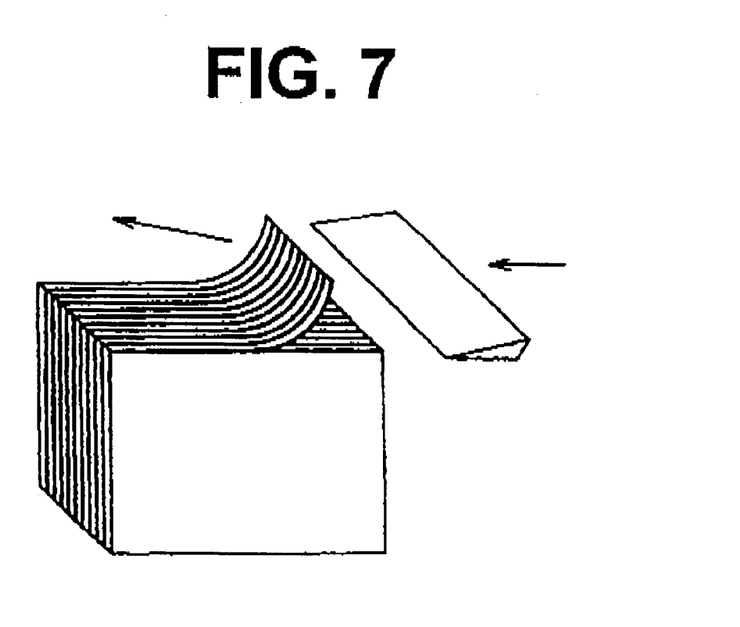
FIG. 7 shows a step for slicing the laminate processed in FIG. 6 to give the partitioned stimulable phosphor film of FIG. 1.

4) The laminate block was repeatedly sliced in the manner illustrated in FIG. 7 using a wide microtome, to produce plural partitioned stimulable phosphor film (thickness: 100 μm, width of partition: approx. 30 μm, width of stimulable phosphor layer: approx. 100 μm).

5) Three, six or nine partitioned stimulable phosphor films are laminated in such manner that the partitions of the adjoining films perpendicularly cross each other, as illustrated in FIG. 2. Thus, three stimulable phosphor sheets (thickness: approx. 300 μm, approx. 600 μm, or approx. 900 μm) were prepared.

EXAMPLE 2

The procedures of Example 1 were repeated except for placing a light-reflecting layer on one surface of the stimulable phosphor sheet of approx. 600 μm thick by coating the yttrium oxide particle-containing dispersion employed in 2) above, to produce a stimulable phosphor sheet having a light-reflecting layer on one side.

EXAMPLE 3

The procedures of Example 1 were repeated except for fixing a transparent polyethylene terephthalate film (thickness: 300 μm) on one surface of the stimulable phosphor sheet of approx. 600 μm thick, using an adhesive, to produce a stimulable phosphor sheet having a transparent cover film.

Comparison Example 1

The laminate block prepared in Example 1–3) was sliced in the manner illustrated in FIG. 7 to give three stimulable phosphor sheets (thickness: 320 μm, 590 μm, and 910 μm) having partitions extending one dimensionally.

Comparison Example 2

Stimulable phosphor (BaF(Br,I):Eu) particles (median of the particle sizes: 5 μm) and a thermoplastic high molecular weight-polyester resin were dispersed in an organic solvent in a weight ratio of 20:1. The prepared phosphor dispersion was coated on a temporary support having a releasing surface, and dried to give a dry phosphor film. The dry phosphor film was peeled off from the temporary support to obtain a stimulable phosphor sheet having a thickness of approx. 290 μm, approx. 600 μm, or approx. 880 μm which had no partitions on its surface.

Evaluation of Stimulable Phosphor Sheet

The stimulable phosphor sheets obtained in Examples 1 to 3 and Comparison Examples 1 and 2 were exposed to irradiation of X-rays (tube voltage: 80 kVp, 80 mA, radiation dose: 10 mR). Subsequently, a He-Ne laser beam was scanned on the irradiated stimulable phosphor sheet, and the stimulated emission was collected on the side on which the laser beam was scanned. The amount of the stimulated emission was detected to determine the sensitivity.

Independently, the stimulable phosphor sheet was exposed to X-rays in the same manner except for placing a CTF chart on the phosphor sheet. The scanning with the laser beam and the collection of the stimulated emission were carried out in the same manner to obtain radiation image data. The sharpness was evaluated using the obtained radiation image data. In the exposure to X-rays, the CTF chart was so placed on the stimulable phosphor sheet that the partitions of the phosphor sheet on the top partitioned phosphor film and the stripes of the CIF were arranged perpendicularly to each other (first run) or aligned in parallel (second run). The stimulated emission produced from the stimulable phosphor sheet of Example 3 was collected from both surface sides The results are set forth in Table 1.

TABLE 1

| Phosphor Sheet | Thickness (μm) | 1 lp-CTF (%) | | Stimulated Emission |
|---|---|---|---|---|
| | | First run | Second run | |
| Example 1 | 300 | 84 | 80 | 84 |
| | 600 | 80 | 76 | 112 |
| | 900 | 76 | 70 | 155 |

TABLE 1-continued

| Phosphor Sheet | Thickness ($\mu$m) | 1 lp-CTF (%) First run | 1 lp-CTF (%) Second run | Stimulated Emission |
|---|---|---|---|---|
| Example 2 | 600 | 78 | 74 | 130 |
| Example 3 | 600 | 76 | 72 | 145 |
| Com. Ex. 1 | 320 | 86 | 48 | 88 |
|  | 590 | 83 | 44 | 120 |
|  | 910 | 80 | 42 | 162 |
| Com. Ex. 2 | 290 | 81 | 80 | 100 |
|  | 600 | 70 | 71 | 122 |
|  | 880 | 65 | 64 | 125 |

From the results of Table 1, it is confirmed that the stimulable phosphor sheet of the invention (Example 1) gives a reproduced radiation image of high sharpness not only in the first run but also in the second run, as compared with the stimulable phosphor sheet of Comparison Example 1. This is favorable for reproducing a radiation image for diagnosis. The stimulable phosphor sheet of Comparison Example 2, which is a conventional stimulable phosphor sheet) also gives a reproduced radiation image of relatively high sharpness not only in the first run but also in the second run, as compared with the stimulable phosphor sheet of Comparison Example 1. However, in the case that the thickness of the stimulable phosphor sheet, the phosphor sheet of Comparison Example 2 decreases the sensitivity rapidly, while its sensitivity increases only slightly.

The stimulable phosphor sheets of Examples 2 and 3 show sensitivity apparently higher than that of the stimulable phosphor sheet of Example 1.

EXAMPLE 4

The procedures of Example 1 were repeated except for laminating, in order, three (six or nine) partitioned stimulable phosphor films in such manner that the partitions of a upper film crossed the partitions of a lower film at an angle of 60°. Thus, three stimulable phosphor sheets (thickness: approx. 300 $\mu$m, approx. 600 $\mu$m, or approx. 900 $\mu$m) were prepared.

EXAMPLE 5

The procedures of Example 1 were repeated except for so slicing the laminate block as to give plural partitioned stimulable phosphor films having different thicknesses in the range of 50 to 600 $\mu$m, in the step 4).

The plural partitioned stimulable phosphor films having different thickness are laminated in such manner that the partitions of one of the adjoining films crossed perpendicularly the partitions of another film. In this manner, four stimulable phosphor sheets set forth in Table 2 were prepared.

TABLE 2

| Phosphor Sheet | Thickness of Film ($\mu$m) First | Second | Third | Fourth | Fifth | Sixth |
|---|---|---|---|---|---|---|
| Example 4 | 100 | 100 | 100 | 100 | 100 | 100 |
| Example 5 | 50 | 550 | — | — | — | — |
|  | 100 | 500 | — | — | — | — |
|  | 100 | 100 | 400 | — | — | — |
|  | 100 | 100 | 100 | 300 | — | — |

Remarks: Films are counted from the top of the stimulable phosphor sheet.

The three stimulable phosphor sheets of Example 4 and the four stimulable phosphor sheets of Example 5 were evaluated in their sensitivity and sharpness in the same manner as described above. It was confirmed that these stimulable phosphor sheets showed satisfactory sensitivity and sharpness.

What is claimed is:

1. A stimulable phosphor sheet for radiation image recording and reproducing method comprising the steps of recording a radiation image as a latent image, irradiating the latent image with stimulating rays to release stimulated emission, collecting the stimulated emission, and electrically processing the collected emission to reproduce the radiation image, comprising at least two partitioned stimulable phosphor films laminated one on another, the partitioned stimulable phosphor film comprising plural partitions that divide the stimulable phosphor film on a plane thereof to give plural stripe sections, and a stimulable phosphor layer placed in each stripe section, in such manner that the partitions of one stimulable phosphor film are arranged to cross the partitions of another stimulable phosphor film, wherein the partition of the stimulable phosphor film has a light-scattering length for the stimulating rays which is shorter than that of the stimulable phosphor layer.

2. The stimulable phosphor sheet of claim 1, wherein the partitions of one stimulable phosphor film are arranged to perpendicularly cross the partitions of another stimulable phosphor film.

3. The stimulable phosphor sheet of claim 1, wherein the partitions of one stimulable phosphor film are arranged to cross the partitions of another stimulable phosphor film at an angle of 45° or 60°.

4. The stimulable phosphor sheet of claim 1, wherein the partition has a light-scattering length of 0.05 to 20 $\mu$m for the stimulating rays and a light-absorption length of 1,000 $\mu$m or longer for the stimulating rays, while the stimulable phosphor layer has a light-scattering length of 20 to 1,000 $\mu$m for the stimulating rays and a light-absorption length of 1,000 $\mu$m or longer for the stimulating rays.

5. The stimulable phosphor sheet of claim 1, wherein the partition of the stimulable phosphor film comprises low light-absorption fine particles and a binder.

6. The stimulable phosphor sheet of claim 5 wherein the low light-absorbing fine particles comprises metal oxide.

7. The stimulable phosphor sheet of claim 1, wherein the stimulable phosphor layer comprises stimulable phosphor particles and a polymer binder.

8. The stimulable phosphor sheet of claim 1, which comprises 2 to 100 stimulable phosphor films.

9. The stimulable phosphor sheet of claim 1, wherein the stimulable phosphor film has a thickness in the range of 10 $\mu$m to 1,000 $\mu$m.

10. The stimulable phosphor sheet of claim 1, wherein the stimulable phosphor film laminated on another stimulable phosphor film has a thickness smaller than that of the latter phosphor film.

11. The stimulable phosphor sheet of claim 1, wherein the laminate of the stimulable phosphor films are placed between a transparent cover film and a transparent substrate film.

12. The stimulable phosphor sheet of claim 1, wherein the laminate of the stimulable phosphor films are placed between a transparent cover film and a light-reflective substrate film.

13. A process for producing a stimulable phosphor sheet comprising at least two partitioned stimulable phosphor films laminated one or another, the partitioned stimulable phosphor film comprising plural partitions that divide the stimulable phosphor film on a plane thereof to give plural stripe sections, and a stimulable phosphor layer placed in each stripe section, in such manner that the partitions of one stimulable phosphor film are arranged to cross the partitions of another stimulable phosphor film, which comprises the steps of:

producing plural stimulable phosphor films and plural partition films;

laminating the stimulable phosphor films and the partition films alternately, to produce a laminate block;

slicing the laminate block perpendicularly to the plane of the phosphor film, so as to give plural partitioned stimulable phosphor films;

laminating the plural partitioned stimulable phosphor films in such manner that the partitions of one stimulable phosphor film are arranged to cross the partitions of another stimulable phosphor film; and heating the laminate under pressure.

* * * * *